United States Patent [19]
Granz et al.

[11] Patent Number: 5,056,069
[45] Date of Patent: * Oct. 8, 1991

[54] ULTRASONIC SENSOR

[75] Inventors: Bernd Granz, Oberasbach; Georg Koehler, Geisfeld, both of Fed. Rep. of Germany

[73] Assignee: Siemens Aktiengesellschaft, Berlin & Munich, Fed. Rep. of Germany

[ * ] Notice: The portion of the term of this patent subsequent to Mar. 29, 2005 has been disclaimed.

[21] Appl. No.: 473,576

[22] Filed: Feb. 1, 1990

[30] Foreign Application Priority Data

Feb. 10, 1989 [EP] European Pat. Off. ........ 89102331.9

[51] Int. Cl.$^5$ ...................... H04R 17/00; H01L 41/08
[52] U.S. Cl. .................... 367/164; 367/165; 367/163; 310/324; 181/148; 181/175
[58] Field of Search ............... 310/337, 324; 367/157, 367/163, 164, 165, 166, 171, 130; 128/653 R, 660.01, 660.02, 24 24 A; 181/148, 175

[56] References Cited

U.S. PATENT DOCUMENTS

| | | | |
|---|---|---|---|
| 4,475,376 | 10/1984 | Keilman | 367/13 X |
| 4,535,205 | 8/1985 | Ravinet et al. | 367/157 |
| 4,674,505 | 6/1987 | Pauli | 128/328 |
| 4,734,611 | 3/1988 | Granz | 310/334 X |
| 4,821,838 | 4/1989 | Chen | 367/188 X |

FOREIGN PATENT DOCUMENTS

| | | |
|---|---|---|
| 0015159 | 9/1980 | European Pat. Off. . |
| 0133665 | 3/1985 | European Pat. Off. . |
| 0227985 | 7/1987 | European Pat. Off. . |
| 0256202 | 2/1988 | European Pat. Off. . |

OTHER PUBLICATIONS

Ultrasonics, May 1980, pp. 123–126.

Primary Examiner—Brian S. Steinberger

[57] ABSTRACT

An ultrasonic sensor which is particularly suited to measuring the sound-pressure amplitude in the focus range of a lithotripter and includes in a region a piezoelectrically activated polymeric foil, which is coupled to electrodes. The polymeric foil is mounted in a housing, which has a convex curved, dome-shaped surface at least in one region located opposite one of the flat sides of the polymeric foil. A simple measurement of the sonic field is thus made possible directly on the rubber-diaphragm encased, water-filled delay path of the lithotripter.

6 Claims, 1 Drawing Sheet

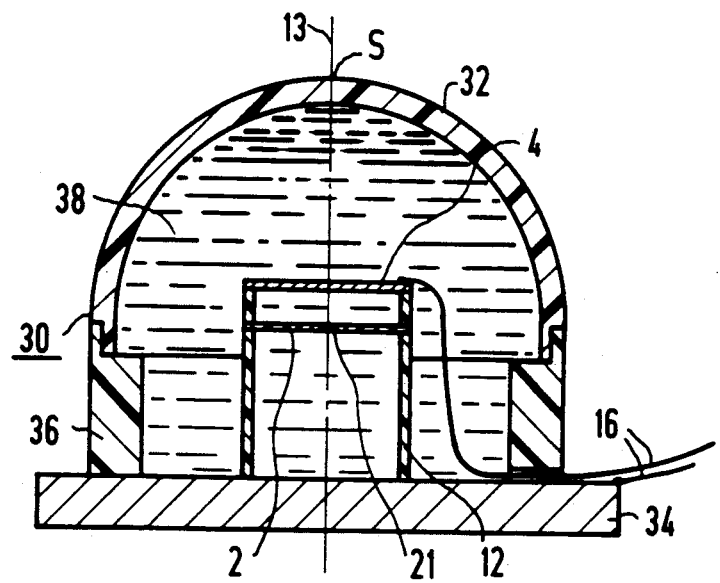
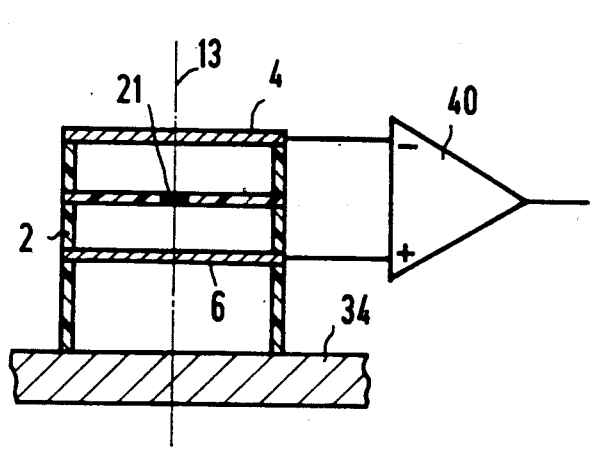
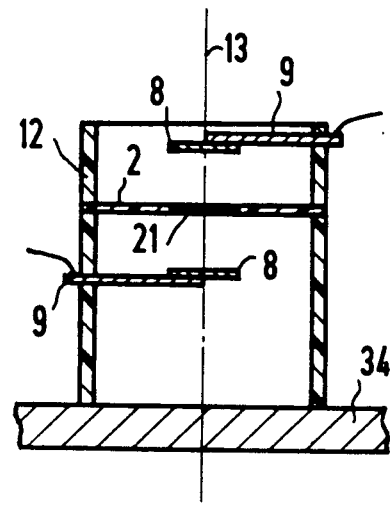

ULTRASONIC SENSOR

BACKGROUND OF THE INVENTION

The present invention relates to an ultrasonic sensor.

So-called diaphragm- or miniature hydrophones are used in the determination of the characteristics of an ultrasonic field prevailing within a sound-carrying medium such as water. The three-dimensional distribution of the sound-pressure amplitude of the ultrasonic field is detected in that the prevailing sound-pressure is measured with this type of hydrophone at different locations in a measuring tank. During this measurement, these hydrophones should influence the sonic field to be measured as little as possible.

For example, in "Ultrasonics, May 1980, pp. 123 to 126" a diaphragm hydrophone is revealed in which a foil of polyvinylidene fluoride PVDF with a thickness of 25 um is clamped between two metal rings serving as supporting bodies. In this manner, a diaphragm with an inside diameter of approximately 100 nm is formed. The surfaces of the diaphragm are provided, in a small central region, with disk-shaped electrodes lying opposite each other whose diameter amounts to 4 mm, for example. Between these electrodes there is the polarized piezoelectrically active region of the diaphragm. Supply leads mounted on the surface of the diaphragm as metallic films run from the disk-shaped electrodes to the rim of the diaphragm, and there, with the aid of conductive adhesive, they make contact with a coaxial cable.

In the case of this known hydrophone, however, problems can arise during the measurement of ultrasonic shockwaves, especially in the case of frequent application. These kinds of shockwaves having very steep pulse edges whose rise times are less than 1 usec and whose pressure amplitudes lie in the range of $10^8$ Pa, lead over time to a mechanical destruction of the metallic electrodes attached to the PVDF layer, which (mechanical destruction) is caused by cavitation effects. Such shockwaves appear e.g., in the focus range of lithotripters in which a focused ultrasonic shockwave is used to destroy concrements, e.g., kidney stones in the kidney of a patient. Not only during development, but also during the routine monitoring of these types of apparatus, it is necessary to determine the characteristics of the shockwave in the focus range.

An especially suitable ultrasonic sensor for measuring such shockwaves is known from European Patent Application A2-0 227 985, in which a polymeric foil, which is fastened at its rim area to a supporting body, is piezoelectrically activated in a sub-range and is coupled electrically to electrodes which are mounted in spatial separation from the piezoelectrically active area. The surface charge oscillations, created by an ultrasonic wave, within the piezoelectrically active range of the polymeric foil are coupled electrically via the sound-carrying medium which surrounds the polymeric foil to the electrodes mounted outside of the surface area of the polymeric foil assigned to the piezoelectrically active region of the polymeric foil. The piezoelectrically active central region of the polymeric foil can thus be designed within the focus range of a focused ultrasonic shockwave since there is no mechanically unstable, electrically conductive layer present in the central region of the polymeric foil.

A purely capacitive coupling without high signal loss is possible by means of the use of a piezoelectric polymer with a dielectric constant that is relatively low in comparison with piezoceramic materials. The electrodes can accordingly be mounted in spatial separation from the piezoelectrically active region of the polymeric foil as well as on the foil itself as well as outside of the foil, too, e.g., on the supporting body of the foil.

In the case of lithotripters which are mounted in a water tank in which the patient is also located for treatment, supervision of the focus by means of the ultrasonic sensors is possible without any problems These ultrasonic sensors must simply be placed in the water tank at hand for supervisory purposes. Newer lithotripters, however, are comprised of a flexible shockwave transmitter, which as a rule is coupled to the body of a patient via a saccular, rubber diaphragm encased, water-filled delay path (EP-A2-0 133 665). A water tank, in which the patient must take a seat and in which an ultrasonic sensor can be mounted for supervisory purposes, thus no longer exists.

For the practical implementation of routine measurements in the focus range of this kind of lithotripter, however, is desirable that these routine measurements be possible without more extensive preparation and with little effort. This is not possible with the known ultrasonic sensors. As a rule, the shockwave transmitter must be removed and be checked at a separate measuring location in a measuring tank prepared specifically for this purpose.

SUMMARY OF THE INVENTION

It is an object of the present invention to provide an ultrasonic sensor which is particularly suited for routine measurements in the focus range of a lithotripter.

The above and other objects of the invention are achieved by an ultrasonic sensor comprising a self-supporting polymeric foil fastened within a holding device, which is piezoelectrically activated at least in one region and is coupled with electrodes, whereby the the polymeric foil is mounted within a housing, having a convex curved, dome-shaped surface at least in one region located opposite one of the flat sides of the polymeric foil.

For controlling the focus the ultrasonic sensor can be pressed into the delay path of the lithotripter, which delay path is sealed by a rubber diaphragm. By means of the convex curved, domed shape of the housing, it guaranteed that no air-filled pockets can arise between the rubber diaphragm and the housing which air pockets could cause an incorrect measurement.

In a particularly preferred refinement of the invention, an ultrasonic sensor is provided in which the signal electrodes are arranged in spatial separation from the piezoelectrically activated region. Since no thin electrodes are superimposed on the surface of the polymeric foil in its piezoelectrically activated region, the durability of the ultrasonic sensor and the repeatability of the measurements carried out by it are improved.

In an advantageous development of the invention, a spherical surface is provided, whose center of curvature coincides at least approximately with the piezoelectrically activated region. In this manner, the ultrasonic sensor is freely adjustable at two angular coordinates and its angular acceptance is now only dependent on the size of the piezoelectrically activated region.

The housing preferably consists of plastic in the region of the convex curved, dome-shaped surface in order to largely prevent disturbing reflections on the housing surface.

BRIEF DESCRIPTION OF THE DRAWINGS

The invention will be described in greater detail in the following detailed description with reference to the drawings, in which:

FIG. 1 shows in section a schematic of a preferred specific embodiment of an ultrasonic sensor according to the invention; and FIGS. 2 and 3 show a segment of an ultrasonic sensor having a particularly advantageous electrode arrangement, also in section.

DETAILED DESCRIPTION

According to FIG. 1, a self-supporting polymeric foil 2 is mounted in a holding device 12. The holding device 12 has the shape of a hollow cylinder and is mounted on one of its end faces on a base plate 34. The polymeric foil 2 is clamped in the holding device 12 with its flat sides perpendicular to the center axis 13 of the hollow cylinder. The base plate 34 is part of a housing 30, which has a convex curved, dome-shaped surface 32 in a region lying opposite the base plate 34. In a preferred refinement, this surface 32 is spherical and the center axis 13 of the hollow cylindrical holding device 12 intersects this surface 32 at its axis S. The convex curved housing part rests on a hollow cylindrical frame 36 also connected to the base plate and preferably consists of a plastic with the least possible acoustic impedance, particularly polymethylpentene PMP or polystyrene PS. The frame 36 and the holding device 12 also consist of a plastic in a preferred specific embodiment.

The polymeric foil 2 is between 10 um and 100 um thick and has an open diameter of approximately 10–20 mm. The polymeric foil 2 is piezoelectrically activated in a central region 21, which has a diameter of approximately 1–2 mm. The cylindrical holding device 12 has, e.g., a wall thickness of 0.5 mm and is provided with an electrode 4 on its end face turned away from the base plate 34, which electrode 4 serves as a signal electrode and which seals the holding device 12 like a covering. The electrode 4 thus is mounted parallel to the polymeric foil 2. The distance between the electrode 4 and the polymeric foil 2 preferably amounts to approximately 3 mm. A thin, e.g., 20 um thick, metallic foil, preferably a metallic lattice of high-grade steel, is provided as the electrode 4.

The entire interior of the housing 30 is filled with a sound-carrying liquid 38 with a high dielectric constant, e.g., highly-purified water with a conductivity less than 10 µS/cm, or silicone lubricant preferably glycerol. The electrode 4 and the metallic base plate 34 form both of the electrodes for the capacitive intake of the load signal produced in the piezoelectrically activated region of the polymeric foil 2, which (load signal) can be picked off on the electrical supply lines 16 as a signal voltage.

In a particularly preferred development according to FIG. 2, a signal electrode 6 is provided which is mounted in the cylindrical holding device 12 between the polymeric foil 2 and the base plate 34. The electrode 4 mounted on the end face of the cylindrical holding device 12 is provided as a counterelectrode in this specific embodiment. The base plate 34 can consist of metal or of plastic. The electrodes are preferably symmetrically mounted along with the polymeric foil 2. In this manner, the signal can be read out by a differential amplifier 40, whose inputs are connected to one electrode 4 or 6, respectively. Electrical disturbances, which occur equally on both electrodes 4 and 6, are thereby suppressed.

According to FIG. 3, electrodes 8 are suited for the capacitive intake of the load signal, which electrodes 8 do not extend across the entire free cross-sectional area of the holding device 12 and do not cover the entire area of the polymeric foil 2. According to the example of the figure, these electrodes are mounted on a pin-type carrier 9, which is cemented in place in the holding device 12. In a configuration of the carrier 9 displaced by 180°, particularly parasitic capacitances are reduced in this specific embodiment.

In place of electrodes 4 and 6 mounted perpendicular to the center axis 13, also ring-shaped electrodes can be provided in a further specific embodiment, which ring-shaped electrodes are mounted on the inner wall of the cylindrical holding device 12. This has the advantage that no disturbing boundary surfaces are located in the sound ray.

In the foregoing specification, the invention has been described with reference to specific exemplary embodiments thereof. It will, however, be evident that various modifications and changes may be made thereunto without departing from the broader spirit ad scope of the invention as set forth in the appended claims. The specification and drawings are, accordingly, to be regarded in an illustrative rather than in a restrictive sense.

What is claimed is:

1. An ultrasonic sensor comprising:
   a self-supporting polymeric foil fastened within a holding device, said foil being piezoelectrically activated at least in one region and being coupled to electrodes, the polymeric foil being disposed within a housing having a convex curved, dome-shaped surface at least in one region located opposite a flat side of the polymeric foil, the dome-shaped surface being provided with a center of curvature coinciding at least approximately with the piezoelectrically activated region.

2. The ultrasonic sensor recited in claim 1, wherein the electrodes are mounted in spatial separation from the piezoelectric region.

3. The ultrasonic sensor recited in claim 1, wherein the housing comprises a plastic at least in the region of the convex curved, dome-shaped surface.

4. The ultrasonic sensor recited in claim 1, wherein the holding device forms a hollow cylinder mounted within the housing having a center axis passing through an apex of the convex curved surface and perpendicularly intersecting flat sides of the polymeric foil. the electrodes, are connected to respective inputs of a differential amplifier.

5. The ultrasonic sensor recited in claim 1, wherein the electrodes are symmetrically mounted along with the polymeric foil.

6. The ultrasonic sensor recited in claim 5, wherein the electrodes, are connected to respective inputs of a differential amplifier.

* * * * *